US006722692B2

(12) United States Patent
Fukaya et al.

(10) Patent No.: US 6,722,692 B2
(45) Date of Patent: Apr. 20, 2004

(54) FALLING SHOCK ABSORBING DEVICE FOR WHEELCHAIR

(75) Inventors: Kiyoshi Fukaya, Tokyo (JP); Mitsuya Uchida, Tokyo (JP); Fumio Hosoya, Tokyo (JP); Hidemi Taniuchi, Tokyo (JP); Norihiko Shiratori, Nagano (JP)

(73) Assignees: National Institute of Industrial Safety Independent Administrative Institution, Tokyo (JP); Osamu Tanaka, Yokohama (JP); Prop Co., Ltd., Tokyo (JP); Shinko, Inc., Tokyo (JP); Microstone Corporation, Nagano (JP)

( * ) Notice: Subject to any disclaimer, the term of this patent is extended or adjusted under 35 U.S.C. 154(b) by 108 days.

(21) Appl. No.: 10/019,224

(22) PCT Filed: Apr. 26, 2001

(86) PCT No.: PCT/JP01/03646

§ 371 (c)(1),
(2), (4) Date: Dec. 28, 2001

(87) PCT Pub. No.: WO01/82854

PCT Pub. Date: Nov. 8, 2001

(65) Prior Publication Data

US 2003/0071445 A1 Apr. 17, 2003

(30) Foreign Application Priority Data

May 1, 2000 (JP) ....................................... 2000-132364
Mar. 30, 2001 (JP) ....................................... 2001-101036

(51) Int. Cl.[7] ................................................ B60R 21/22

(52) U.S. Cl. .................................... 280/730.1; 280/735

(58) Field of Search ............................. 280/735, 730.1, 280/730.2, 728.1, 304.1, 250.1; 180/65.1, 907, 7.1, 21; 2/413, DIG. 3

(56) References Cited

U.S. PATENT DOCUMENTS 6,386,576 B1 * 5/2002 Kamen et al. ........... 280/728.1

FOREIGN PATENT DOCUMENTS

| | | |
|---|---|---|
| EP | 1016568 | 7/2000 |
| JP | 9-66789 | 3/1997 |
| JP | 11-335911 | 12/1999 |
| JP | 2000-51379 | 2/2000 |

* cited by examiner

*Primary Examiner*—Eric Culbreth
(74) *Attorney, Agent, or Firm*—Lowe Hauptman Gilman & Berner, LLP

(57) ABSTRACT

A falling shock absorbing apparatus for a wheelchair is provided capable of absorbing shock to the user in the case of falling of a wheelchair. In other words, the falling shock absorbing apparatus for wheelchair of the present invention includes an inflatable air bag for covering a predetermined parts of the wheelchair user when inflating, an inflation apparatus for inflating the air bag, an inclination detecting apparatus for detecting inclination of the wheelchair relative to the surface upon which the wheelchair is moved, and a controller for activating the inflation apparatus to inflate the air bag when inclination of the wheelchair is detected by the inclination detecting apparatus. Thus, the air bag inflates to cover the predetermined parts of the wheelchair user when the wheelchair is tilted.

12 Claims, 10 Drawing Sheets

FALLING SHOCK ABSORBING DEVICE FOR WHEELCHAIR

BACKGROUND OF THE INVENTION

1. Field of the Invention

The present invention relates to a falling shock absorbing apparatus for wheelchair for protecting body in the case of falling of a wheelchair.

2. Description of the Prior Art

A manual wheelchair propelled by its user or an attendant and a self-travelable electric wheelchair operated by its user are conventionally known for use by a person having difficulty in walking. The wheelchair permits a person having difficulty in walking to have a freedom of mobility within the travelable area of the wheelchairs.

However, a wheelchair may fall in an accident, etc., even if it is within its travelable area. In the event of falling of the wheelchair, there is such a problem that a conventional wheelchair is not provided with means for absorbing shock to the user, thus providing poor protection to the user. In particular, wheelchair users are often less agile than non-handicapped persons, and less able to protect themselves against shock in the event of falling of the wheelchair; therefore, there is an increasing need-to protect the wheelchair users.

SUMMARY OF THE INVENTION

In view of the above described problems, it is an object of the present invention to provide a falling shock absorbing apparatus for wheelchair capable of absorbing shock to the user in the event of falling of the wheelchair.

The falling shock absorbing apparatus for a wheelchair of the invention includes an air bag for covering predetermined parts of the wheelchair user when inflating, inflation means for inflating the air bag, inclination detecting means for detecting inclination of the wheelchair relative to the surface upon which the wheelchair is moved, and control means for activating the inflation means to inflate the air bag when inclination of the wheelchair is detected by the inclination detecting means.

Thus, the air bag may be inflated when the wheelchair is tilted and cover the predetermined parts of the wheelchair user to absorb shock to the user if the wheelchair falls; thus the apparatus is significantly advantageous in protecting the wheelchair user against a falling accident, etc.

Also, in accordance with the above described configuration, the air bag may be formed to cover at least human head when inflating so as to absorb shock to the head of the wheelchair user; thus the apparatus is advantageous when high regard is paid to protecting the head in a falling accident.

Further, according to the configuration, a body-worn gear may be provided which is detachably fitted to the wheelchair user, and to which the air bag is attached, to ensure that the air bag may cover the predetermined parts of the user; thus the apparatus works effectively when the user is thrown out of the wheelchair, e.g., in the event of falling.

Besides, according to the configuration, an air bag may be provided which inflates out to at least one of the back, front, right and left sides of the wheelchair when inclination of the wheelchair is detected by the inclination detecting means, to support the wheelchair which is to fall toward its declined direction; thus the apparatus is effective in preventing the wheelchair from tipping over.

Moreover, according to the configuration, the above described inclination detecting means may comprise plural distance sensors for measuring respective distances from plural points on the front and back, and the right and left of the wheelchair to the surface on which the wheelchair is moved so as to determine inclinations of the wheelchair based on respective differences in distances measured by the distance sensors both at the front and back and at the right and left of the wheelchair; thus the inclination detecting means may determine inclination of the wheelchair in any direction; backward, forward, rightward and leftward, based on a difference in distances measured by the distance sensors, making sure to inflate the air bag in the case of falling in any direction.

Furthermore, according to the configuration, the inclination detecting means may comprise an angular velocity sensor for measuring angular velocities on both the front-to-back and the right-to-left axes of the wheelchair so as to determine inclination of the wheelchair based on respective angular velocities measured by the angular velocity sensor; thus the inclination detecting means may determine inclination of the wheelchair in any direction; backward, forward, rightward and leftward, based on the corresponding angular velocity measured by the angular velocity sensor, making sure to inflate the air bag in the event of falling in any direction.

Still further, the inclination detecting means may comprise both the distance sensors and an angular velocity sensor, so that both the distance sensors and angular velocity sensor may detect inclination of the wheelchair, minimizing the chance of wrong operations.

DESCRIPTION OF THE PREFERRED EMBODIMENTS

Figure 1:
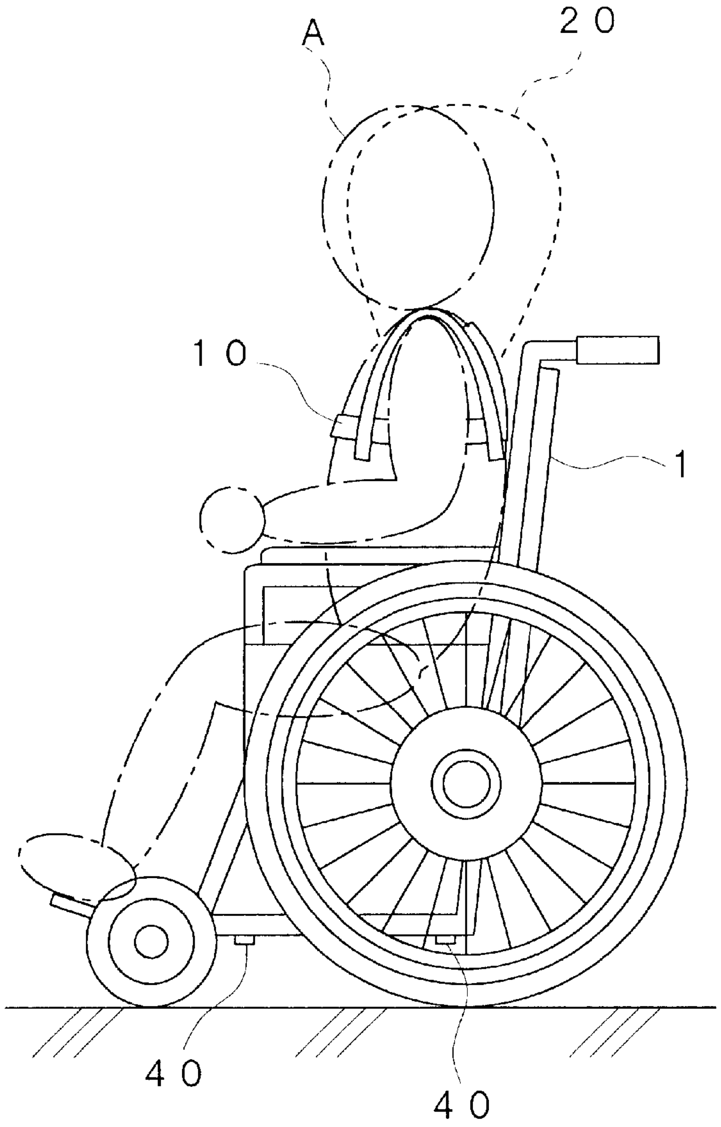
FIG. 1 is a side view of a wheelchair and a falling shock absorbing apparatus for wheelchair according to a first embodiment of the present invention.
Figure 2:
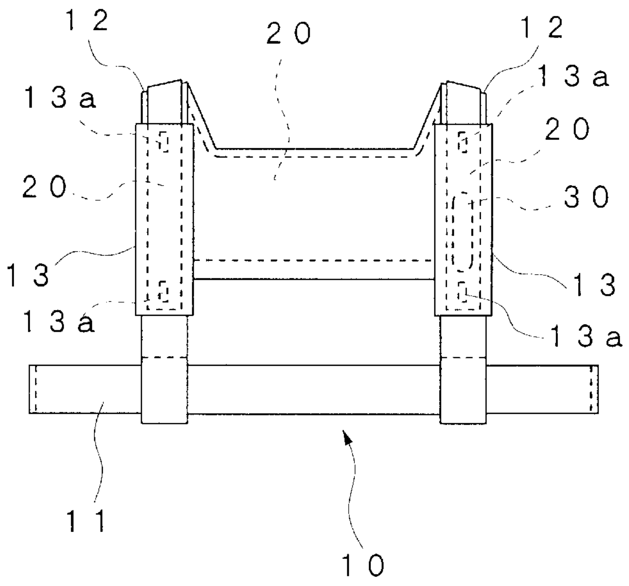
FIG. 2 is an elevational view of a body-worn gear according to the first embodiment.
Figure 3:
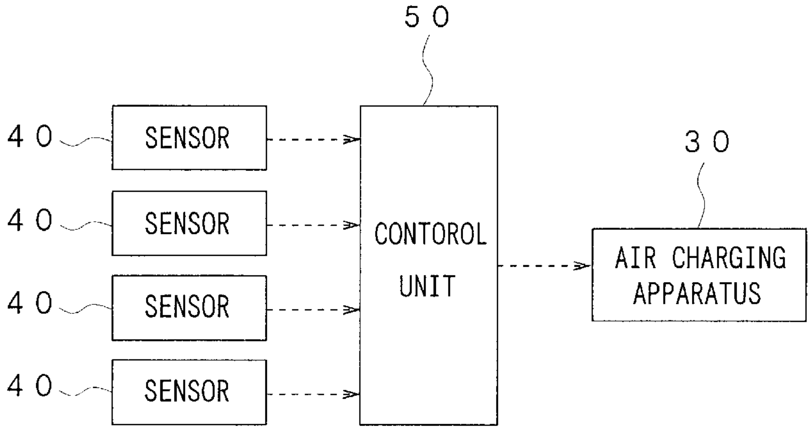
FIG. 3 is a block diagram of a control system according to the first embodiment.

FIGS. 1 through 7 show a first embodiment of the present invention.

Equipment for protecting a human body, i.e., a falling shock absorbing apparatus for wheelchair, shown in the drawings is composed of a body-worn gear 10 detachably fitted to a user A of a wheelchair 1, an air bag 20 attached to the body-worn gear 10, an air charging apparatus 30 for inflating the air bag 20, plural sensors 40 for measuring distances from the wheelchair 1 to the surface (best seen at 1300 in FIG. 13) upon which the wheelchair is moved, and a control unit 50 for causing the air bag 20 to inflate when inclination of the wheelchair 1 is detected based on the distances measured by the sensors 40.

The body-worn gear 10 has a belt 11 winding around a chest of a human body, and a pair of right and left shoulder belts 12 connected to the belt 11 at respective ends. At the front of each shoulder belt 12, there is provided a cover 13 for containing a portion of the air bag 20, opposite ends of each cover 13 being detachably tied together with plural fasteners 13*a* made of detachable, well-known cloth tapes, for example.

The air bag 20, which is formed along body parts from around a back of neck to shoulders and a chest, is made of an airtight and durable textile. Ends of the air bag 20 (parts extending along the shoulders and the chest) are folded along the respective shoulder belts 12 of the body-worn gear 10 and covered by the respective covers 13.

The air charging apparatus 30 has a well-known construction with a gas container filled with high-pressure gas, a gas discharge opening thereof being connected to the air bag 20. The air charging apparatus 30 is designed to explode gunpowder in an opener upon receiving an electric signal from an igniter (not shown) and open a tap of the gas container.

Each sensor 40 comprises a known instrument such as an ultrasonic sensor or a photo sensor for measuring a distance from an object to be measured, and is mounted at each of four points; front, rear, right and left, on an undersurface of the wheelchair 1, and designed to measure a distance to the surface 1300 on which the wheelchair 1 travels.

The control unit 50 comprises a microcomputer and is connected to the air charging apparatus 30 and all sensors 40, and designed to activate the air charging apparatus 30 when a difference in distances measured by the front and rear sensors 40 or by the right and left sensors 40 exceeds a respectively predetermined value. Further, the control unit 50 is located on the wheelchair 1, connected to the body-worn gear 10 with a lead wire, etc., (not shown).

Figure 4:
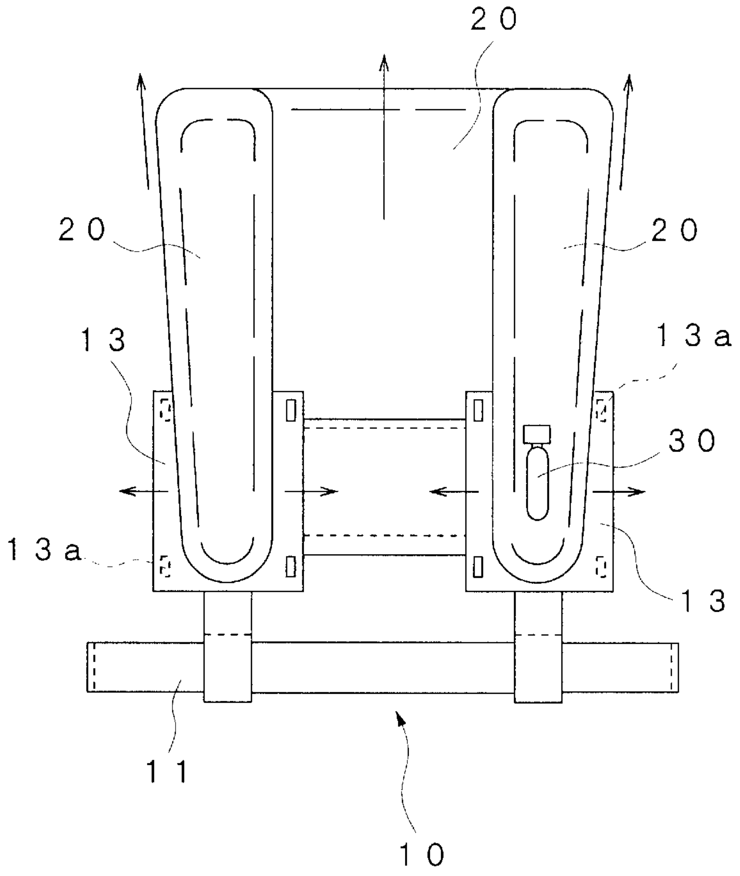
FIG. 4 is an elevational view of an air bag in an inflated state according to the first embodiment.
Figure 5:
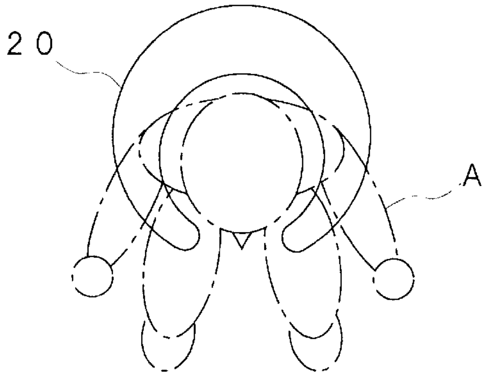
FIG. 5 is a plan view of the air bag in an inflated state and a human body according to the first embodiment.
Figure 6:
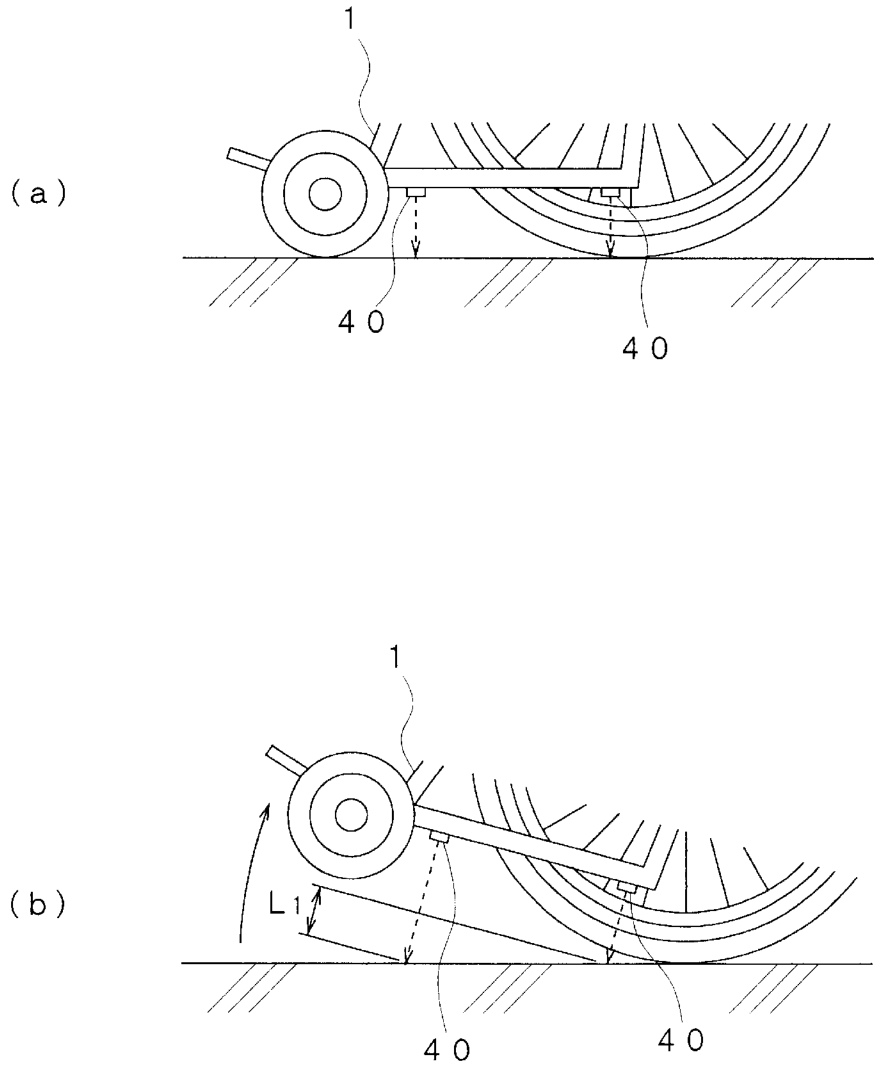
FIG. 6 is a partial side view of the wheelchair tilted forward or backward according to the first embodiment.
Figure 7:
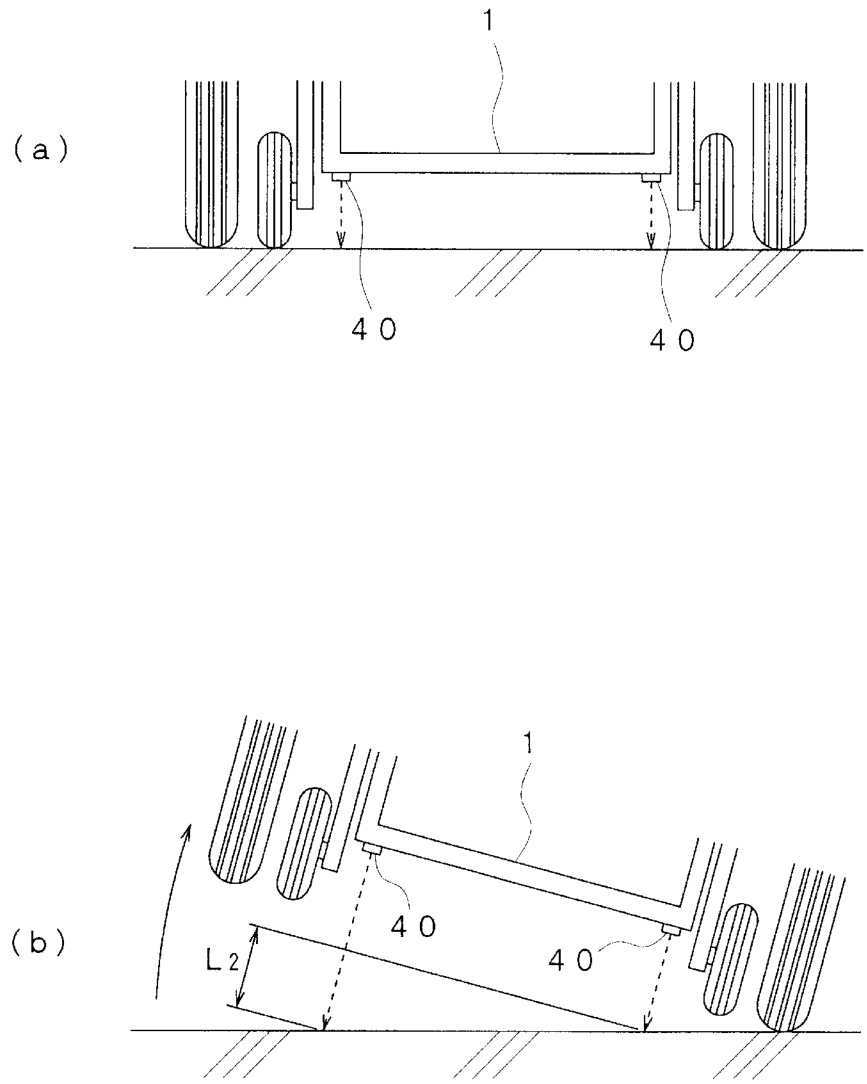
FIG. 7 is a partial elevation view of the wheelchair tilted rightward or leftward according to the first embodiment.

According to the above described configuration, when the wheelchair 1 is tilted with the user A wearing the body-worn gear 10, inclination of the wheelchair 1 is detected by the sensors 40, thereby activating the air charging apparatus 30 to inflate the air bag 20. On such an occasion, initial inflation of the air bag 20 unfastens the fasteners 13*a* of each cover 13 of the body-worn gear 10 and allows the air bag 20 to inflate out as shown in FIG. 4. The air bag 20 inflates out around the head of the wheelchair user A as shown in FIG. 5 to cover the head and neck of the user A, thereby absorbing shock to the user A in the event of falling of the wheelchair 1. If the wheelchair 1 tilts back or forth as shown in FIG. 6, the control unit 50 is designed to permit the air bag 20 to inflate when a difference L1 in distances relative to the surface 1300 measured by the front and rear sensors 40 exceeds a predetermined value. If the wheelchair 1 tilts right or left as shown in FIG. 7, the control unit 50 is designed to permit the air bag 20 to inflate when a difference L2 in distances relative to the surface 1300 measured by the right and left sensors 40 exceeds a predetermined value.

According to this embodiment, the air bag 20 fitted to the wheelchair user A is allowed to inflate when inclination of the wheelchair 1 is detected to cover the predetermined parts of the user A, permitting the air bag 20 to absorb shock to the user A in the event of falling of the wheelchair 1; thus the falling shock absorbing apparatus is significantly advantageous in protecting the user A in the wheelchair 1 in a falling accident, etc.

In this case, the apparatus functions effectively when the user A is, for example, thrown out of the wheelchair 1 in the event of falling, since the air bag 20 is mounted on the body-worn gear 10 worn by the wheelchair user A, thus making sure to cover the predetermined parts of the user A.

In addition, inclinations of the wheelchair 1 are detected based on differences in distances measured by the front and rear sensors 40 and by the right and left sensors 40, respectively, so both inclinations to the back or forth and to the right or left of the wheelchair 1 can be detected, making sure to inflate the air bag 20 in the event of falling in any direction.

Though the air bag 20 is formed to cover the head and the neck of the user A in the above described embodiment, it may be designed to cover other parts of the user A.

Figure 8:
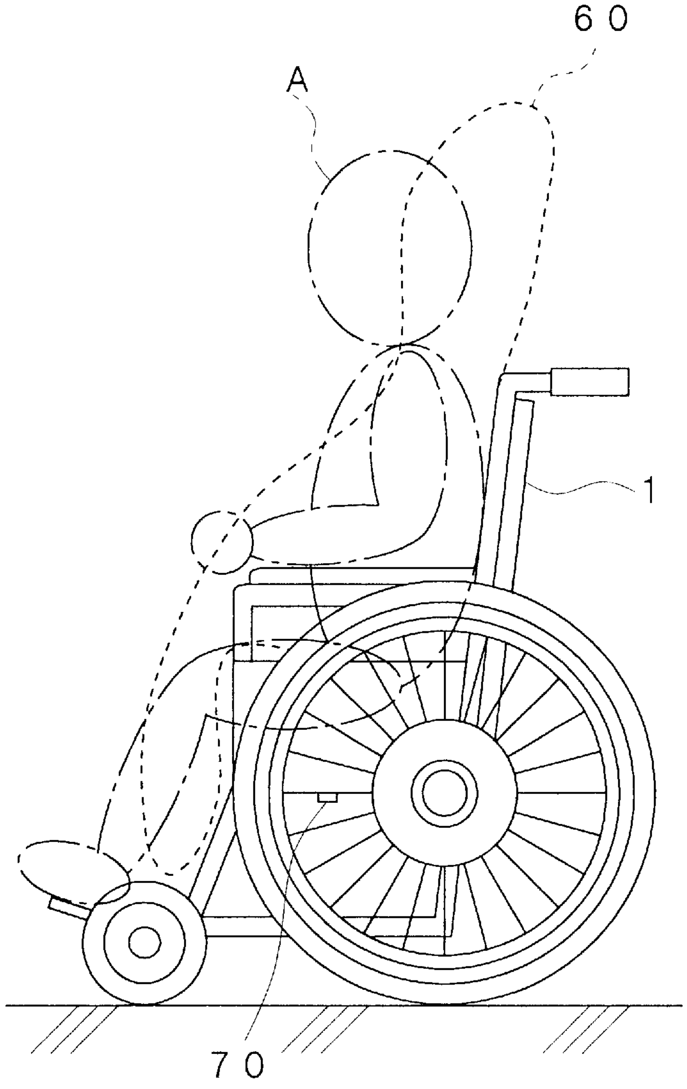
FIG. 8 is a side view of a wheelchair and a falling shock absorbing apparatus for wheelchair according to a second embodiment of the present invention.
Figure 9:
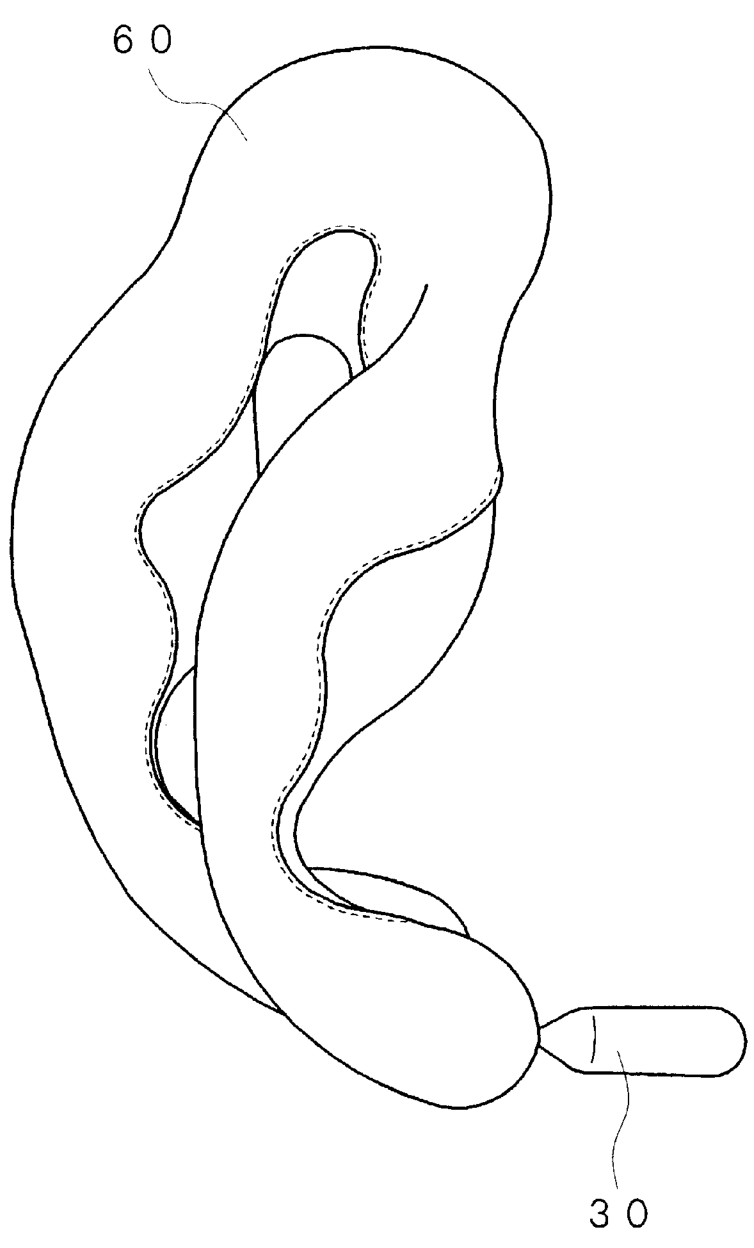
FIG. 9 is a perspective view of an air bag in an inflated state according to the second embodiment.
Figure 10:
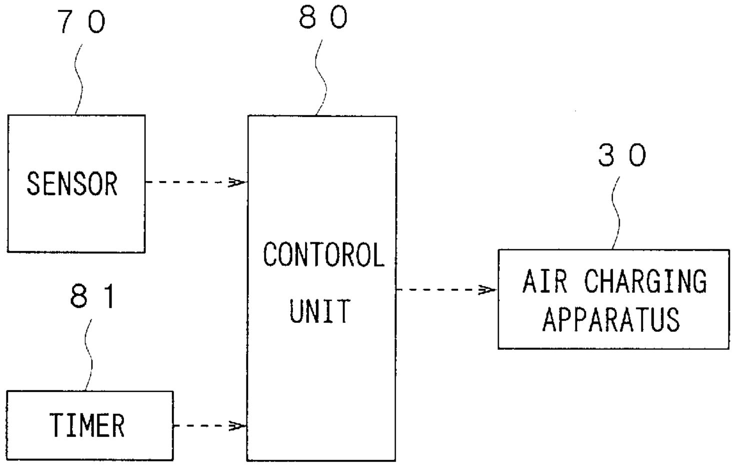
FIG. 10 is a block diagram of a control system according to the second embodiment.
Figure 11:
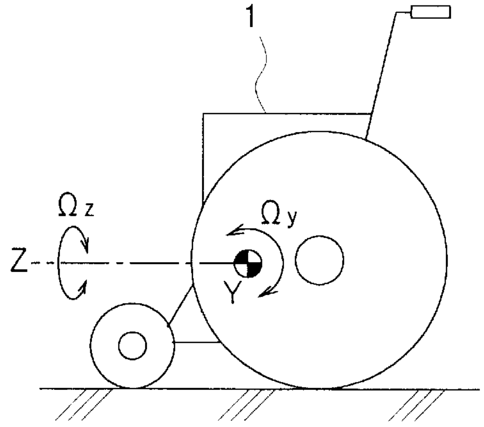
FIG. 11 is a schematic side view showing directions of angular velocities on the wheelchair according to the second embodiment.
Figure 12:
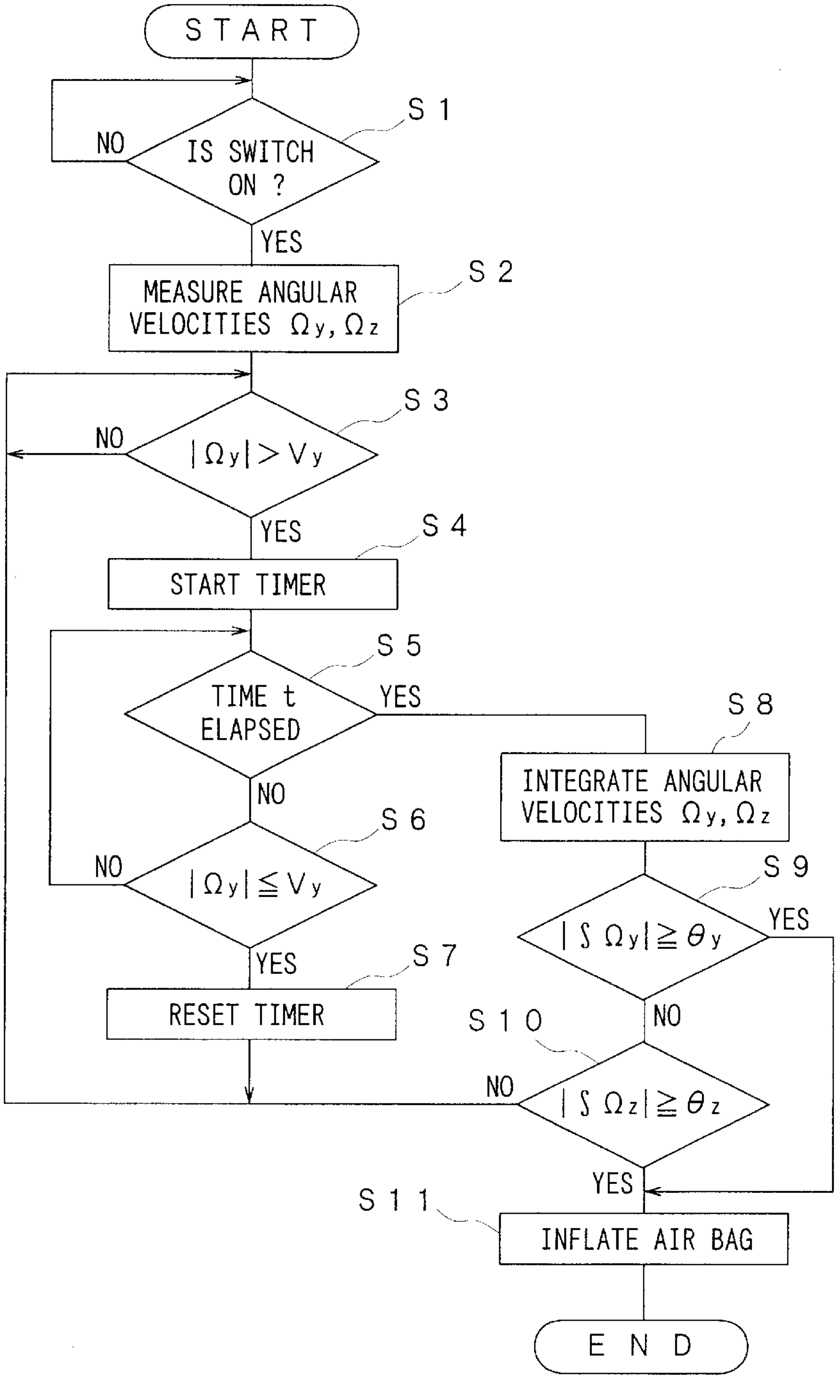
FIG. 12 is a flow chart showing the operation of a control unit according to the second embodiment.

FIGS. 8 through 12 show a second embodiment of the present invention, in which FIG. 8 is a side elevational view of a wheelchair and a falling shock absorbing apparatus for wheelchair, FIG. 9 is a perspective view of an air bag in an inflated state, FIG. 10 is a block diagram showing a control system, FIG. 11 is a schematic side view showing directions of angular velocities on the wheelchair, and FIG. 12 is a flowchart showing the operation of a control unit. Because the configuration of this embodiment is equal to that described above except the air bag, sensors and control unit, like parts are identified by the same reference numerals as in the above described configuration.

The air bag 60 in this embodiment is made of an airtight and durable textile so as to be fitted to a human body of the user A as in the previously described embodiment. The air bag 60 is formed not only to cover body parts extending from head to waist at back and both sides, respectively, but also to bifurcate extending from the waist down along the sides of both legs.

The sensor 70 in this embodiment comprises a known biaxial angular velocity sensor, and is mounted on the wheelchair 1 approximately centrally with respect to both back-to-forth and right-to-left directions. As the biaxial angular velocity sensor, a piezoelectric sensor capable of measuring angular velocities in two directions at the same time may be used, for example. As shown in FIG. 11, the sensor 70 is designed to measure angular velocities both on the right-to-left axis (Y-axis) and the back-to-forth axis (Z-axis) of the wheelchair 1, respectively.

The control unit 80 comprises a microcomputer, and is connected to the air charging apparatus 30 and sensor 70. In addition, a timer 81 is connected to the control unit 80, which is designed to detect inclination of the wheelchair 1 relative to the surface 1300 based on angular velocities $\Omega y$ rotating with regard to the Y-axis (an angular velocity of the wheelchair 1 tilting backward or forward) and $\Omega z$ rotating with regard to the Z-axis (an angular velocity of the wheelchair 1 tilting rightward or leftward) measured by sensor 70, respectively, so as to activate the air charging apparatus 30.

Referring now to the flowchart shown in FIG. 12, the operation of the control unit 80 will be described. First, a switch (not shown) is turned on (S1) and measuring both angular velocities $\Omega y$ and $\Omega z$ gets started (S2). Then, an absolute value of the angular velocity $\Omega y$ for the backward or forward inclination of the wheelchair 1 is checked, and when the value exceeds a predetermined reference velocity Vy, the timer 81 is activated to start clocking (S4). Here, the absolute value of the angular velocity Ωy is checked, and if before a predetermined time period t (e.g., 0.7 seconds) has elapsed (S5) the value becomes equal to the reference velocity or smaller (S6), then the timer 81 is reset (S7), and control is returned to the step S3. If the time t has elapsed in the step S5 before the value becomes equal to the reference velocity or smaller in the step S6, then the angular velocities Ωy and Ωz are integrated respectively (S8). Then, absolute values of an integral (inclination angle) of the angular velocity Ωy and an integral of the angular velocity Ωz are checked, and if the former value is equal to a predetermined reference value θy or larger (S9), or if the latter value is equal to a predetermined reference value θz or larger (S10), then the air charging apparatus 30 is activated to inflate the air bag 60 (S11). If both of the values of the integrals of the respective angular velocities Ωy and Ωz are smaller than their respective reference values θy and θz in the steps S9 and S10, then return to the step S3.

In this way, according to this embodiment, both angular velocity with regard to the right-to-left axis and that with regard to the back-to-forth axis of the wheelchair 1 are detected, so that inclinations of the wheelchair 1 in the back-to-forth and the right-to-left direction can be detected, thus ensuring that the air bag 20 inflates in any direction in the case of falling.

Further, according to the present invention, the air bag 60 in this embodiment may be combined with the sensors 40 in the first embodiment, and also the air bag 20 in the first embodiment may be combined with sensor 70 in this embodiment.

Figure 13:
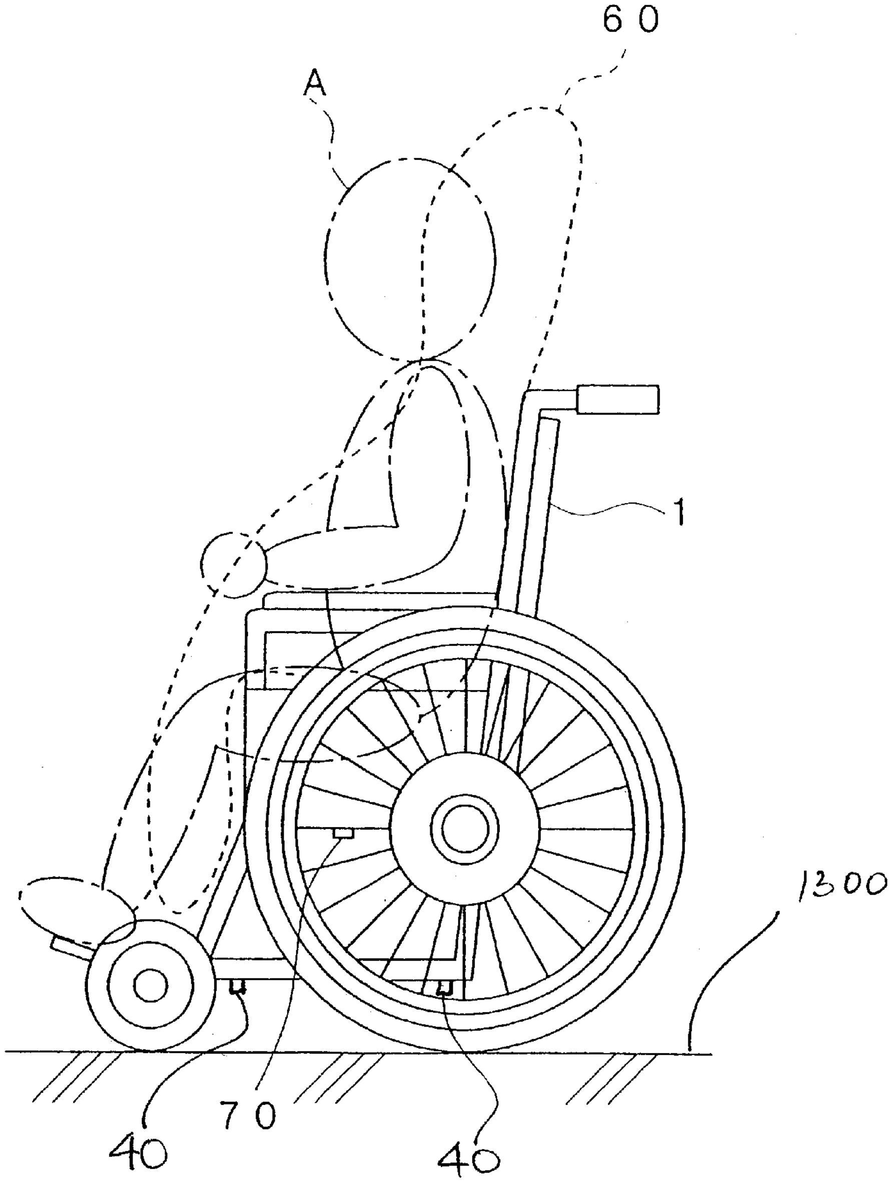
FIG. 13 is a schematic side view of a wheelchair equipped with an apparatus according to a third embodiment of the present invention.

In addition, both types of the sensors 40 and 70 in the first and second embodiments may be provided and the air bag 20 may be designed to inflate only when both inclinations detected by respective sensors 40 and 70 meet predetermined conditions, thereby minimizing the chances of wrong operations. This is the third embodiment of the present invention which is illustrated in FIG. 13.

Furthermore, although the air bag (20 or 60) is shown to be fitted to the human body of the user A in the above described embodiments, it may also be mounted on the wheelchair 1.

Still further, it should be understood that a shape of the air bag is not limited to those illustrated in the first and second embodiments, and the air bag may be formed in any shape. For example, in addition to the air bag for directly absorbing shock to a human body, such an air bag may be employed as the one designed to inflate out to either of the back, front, right and left of the wheelchair 1 when a predetermined inclination of the wheelchair 1 is detected by the sensors 40 or 70 and to support the wheelchair 1 keeping it from falling down.

What is claimed is:

1. A falling shock absorbing apparatus for a wheelchair, said apparatus comprising:

an air bag for covering, upon inflating, predetermined parts of an user seated in the wheelchair;

an air bag inflating system for inflating the air bag;

an inclination detector for detecting inclination of the wheelchair relative to the surface upon which the wheelchair is moved; and a control unit for activating the air bag inflating system to inflate the air bags, based on the detected inclination of the wheelchair;

wherein said inclination detector comprises plural distance sensors for measuring respective distances from plural points on the front and rear, and the right and left of the wheelchair to the surface so as to determine the inclination of the wheelchair based on differences in the distances measured by the front and rear distance sensors and by the right and left distance sensors, respectively.

2. The falling shock absorbing apparatus as set forth in claim 1, wherein said air bag is adapted to cover at least the head of the seated user upon inflating.

3. The falling shock absorbing apparatus as set forth in claim 1, further comprising body-worn gear adapted to be detachably fitted to the user, said air bag being attached to the body-worn gear.

4. The falling shock absorbing apparatus as set forth in claim 1, wherein said air bag is adapted to inflate out toward at least one of the back, front, right and left of the wheelchair upon activation of the air bag inflating system based on the detected inclination of the wheelchair.

5. A falling shock absorbing apparatus for a wheelchair, said apparatus comprising:

an air bag for covering, upon inflating, predetermined parts of a user seated in the wheelchair;

inflation means for inflating the air bag;

inclination detecting means for detecting inclination of the wheelchair relative to the surface upon which the wheelchair is moved; and control means for activating the inflation means to inflate the air bag, based on the detected inclination of the wheelchair;

said inclination detecting means comprising an angular velocity sensor for measuring angular velocities on both the front-to-back and the left-to-right axes of the wheelchair so as to determine the inclination of the wheelchair based on the angular velocities measured by the angular velocity sensor.

6. The falling shock absorbing apparatus as set forth in claim 5, wherein said air bag is adapted to cover at least the head of the seated user upon inflating.

7. The falling shock absorbing apparatus as set forth in claim 5, further comprising body-worn gear adapted to be detachably fitted to the user, said air bag being attached to the body-worn gear.

8. The falling shock absorbing apparatus as set forth in claim 5, wherein said air bag is adapted to inflate out toward at least one of the back, front, right and left of the wheelchair upon activation of the air bag inflating system based on the detected inclination of the wheelchair.

9. A falling shock absorbing apparatus for a wheelchair, said apparatus comprising:

an air bag for covering, upon inflating, predetermined parts of a user seated in the wheelchair;

an air bag inflating system for inflating the air bag;

an inclination detector for detecting inclination of the wheelchair relative to the surface upon which the wheelchair is moved; and a control unit for activating the air bag inflating system to inflate the air bag, based on the detected inclination of the wheelchair;

said inclination detector comprising plural distance sensors for measuring respective distances from plural points on the front and rear, and the right and left of the wheelchair to the surface, and an angular velocity sensor for measuring angular velocities on both the front-to-back and the left-to-right axes of the wheelchair so as to determine the inclination of the wheelchair based on differences in the distances measured by the front and rear distance sensors and by the right and left distance sensors, respectively, as well as on the angular velocities measured by the angular velocity sensor.

10. The falling shock absorbing apparatus as set forth in claim 9, wherein said air bag is adapted to cover at least the head of the seated user upon inflating.

11. The falling shock absorbing apparatus as set forth in claim 9, further comprising body-worn gear adapted to be detachably fitted to the user, said air bag being attached to the body-worn gear.

12. The falling shock absorbing apparatus as set forth in claim 9, wherein said air bag is adapted to inflate out toward at least one of the back, front, right and left of the wheelchair upon activation of the air bag inflating system based on the detected inclination of the wheelchair.

* * * * *